United States Patent
Hays

(10) Patent No.: US 7,912,492 B2
(45) Date of Patent: Mar. 22, 2011

(54) TECHNIQUES TO CONTROL POWER BY CONTROLLING AGGREGATE TRAFFIC IN A CHANNEL

(75) Inventor: Nathan Hays, San Francisco, CA (US)

(73) Assignee: Terrace Communications Corporation, San Francisco, CA (US)

( * ) Notice: Subject to any disclaimer, the term of this patent is extended or adjusted under 35 U.S.C. 154(b) by 792 days.

(21) Appl. No.: 11/833,838

(22) Filed: Aug. 3, 2007

(65) Prior Publication Data
US 2008/0032733 A1 Feb. 7, 2008

Related U.S. Application Data

(60) Provisional application No. 60/835,499, filed on Aug. 4, 2006.

(51) Int. Cl.
*H04B 7/00* (2006.01)
(52) U.S. Cl. ...... 455/522; 455/69; 455/13.4; 455/127.1; 455/452.2; 370/230.1; 370/232
(58) Field of Classification Search .................. 455/522, 455/69, 13.4, 127.1, 452.2; 370/335–337, 370/230.1, 231–235
See application file for complete search history.

(56) References Cited

U.S. PATENT DOCUMENTS

| 5,579,306 A | * | 11/1996 | Dent .............................. 370/330 |
| 6,243,366 B1 | * | 6/2001 | Bradley et al. ................. 370/318 |
| 7,454,222 B2 | * | 11/2008 | Huang et al. ................... 455/522 |

OTHER PUBLICATIONS

In the matter of ARINC Incorporated, Before the Federal Communciations Commission, DA05-1016, Released Apr. 6, 2005, pp. 1-22.

* cited by examiner

*Primary Examiner* — Matthew D. Anderson
*Assistant Examiner* — Shaima Q Aminzay
(74) *Attorney, Agent, or Firm* — Trellis IP Law Group, PC

(57) ABSTRACT

Particular embodiments provide techniques for controlling power in a channel. The power being consumed in a channel may not always be fully used. For example, bursty or Aloha traffic may limit the power being used to transmit data in a channel. Thus, particular embodiments allow transceivers to increase the power used to transmit data in a channel. For example, many transceivers may be allowed to send data in a channel. If all transceivers were transmitting at once at an increased power level, the aggregate power level may be exceeded for the channel. All the transceivers may be allotted a fixed percentage of the aggregate power so as to guarantee not exceeding the power limit. However, not all transceivers may be using their allotted power at the same time. Thus, when the allotted aggregate power in the channel is not fully utilized, a transceiver may increase its traffic beyond its normal portion. For example, the transceiver may use a power-demanding high order modulation scheme to send data.

20 Claims, 5 Drawing Sheets

TECHNIQUES TO CONTROL POWER BY CONTROLLING AGGREGATE TRAFFIC IN A CHANNEL

CROSS REFERENCES TO RELATED APPLICATIONS

This application claims priority from U.S. Provisional patent Application Ser. No. 60/835,499, entitled TECHNIQUES TO CONTROL POWER BY CONTROLLING AGGREGATE TRAFFIC IN A CHANNEL, filed on Aug. 4, 2006, which is hereby incorporated by reference as if set forth in full in this application for all purposes.

BACKGROUND

Particular embodiments generally relate to communication systems and more specifically to techniques for controlling power in a channel.

In communications systems, such as in satellite communications and terrestrial wireless with a limited receiver dynamic range, there may be a maximum allowed power in a channel. In some cases, transmitters are configured such that they cannot exceed a certain amount of power. All of the transmitters in the channel are then regulated such that the maximum power in the channel will not be exceeded when all transmitters are transmitting at their max power. This, however, does not allow flexibility for transmitters. For example, if not all transmitters are transmitting thus underutilizing the allowed power in the channel, and if active transmitters have traffic that could be transmitted using the underutilized power, but are not configured to exceed their individual maximum power levels, then the traffic cannot be sent using power in excess of those power levels. This may occur in environments that include bursty traffic such as web browsing and emails in addition to constant rate traffic such as streaming video and voice.

SUMMARY

Particular embodiments provide techniques for controlling power in a channel. The power being consumed in a channel may not always be fully used. For example, bursty or Aloha traffic may limit the power being used to transmit data in a channel. Thus, particular embodiments allow transceivers to increase the power used to transmit data in a channel. For example, many transceivers may be allowed to send data in a channel. If all transceivers were transmitting at once at an increased power level, the aggregate power level may be exceeded for the channel. All the transceivers may be allotted a fixed percentage of the aggregate power so as to guarantee not exceeding the power limit. However, not all transceivers may be using their allotted power at the same time. Thus, when the allotted aggregate power in the channel is not fully utilized, a transceiver may increase its traffic beyond its normal portion. For example, the transceiver may use a power-demanding high order modulation scheme to send data.

The power used in the channel may be monitored to determine if the power may exceed the allotted aggregate limit. If a power controller detects that aggregate power used may exceed the aggregate limit, the power may be reduced by throttling traffic sent in the channel. In one embodiment, an estimate of aggregate power level in the channel is determined. For example, the aggregate power level may be measured based on traffic received at or transmitted by a satellite. It is then determined if throttling of traffic being sent in the channel should be performed based on the aggregate power level in the channel. For example, there may be a maximum power level that should not be exceeded in the satellite. If the maximum power level may be exceeded or there is a potential to exceed the maximum power level, traffic sent in the channel may be throttled. In one example, transceivers may be throttled such that less traffic is sent in the channel or a lower order modulation scheme that requires less power is used.

A further understanding of the nature and the advantages of the inventions disclosed herein may be realized by reference of the remaining portions of the specification and the attached drawings.

DETAILED DESCRIPTION OF EMBODIMENTS

Figure 1:
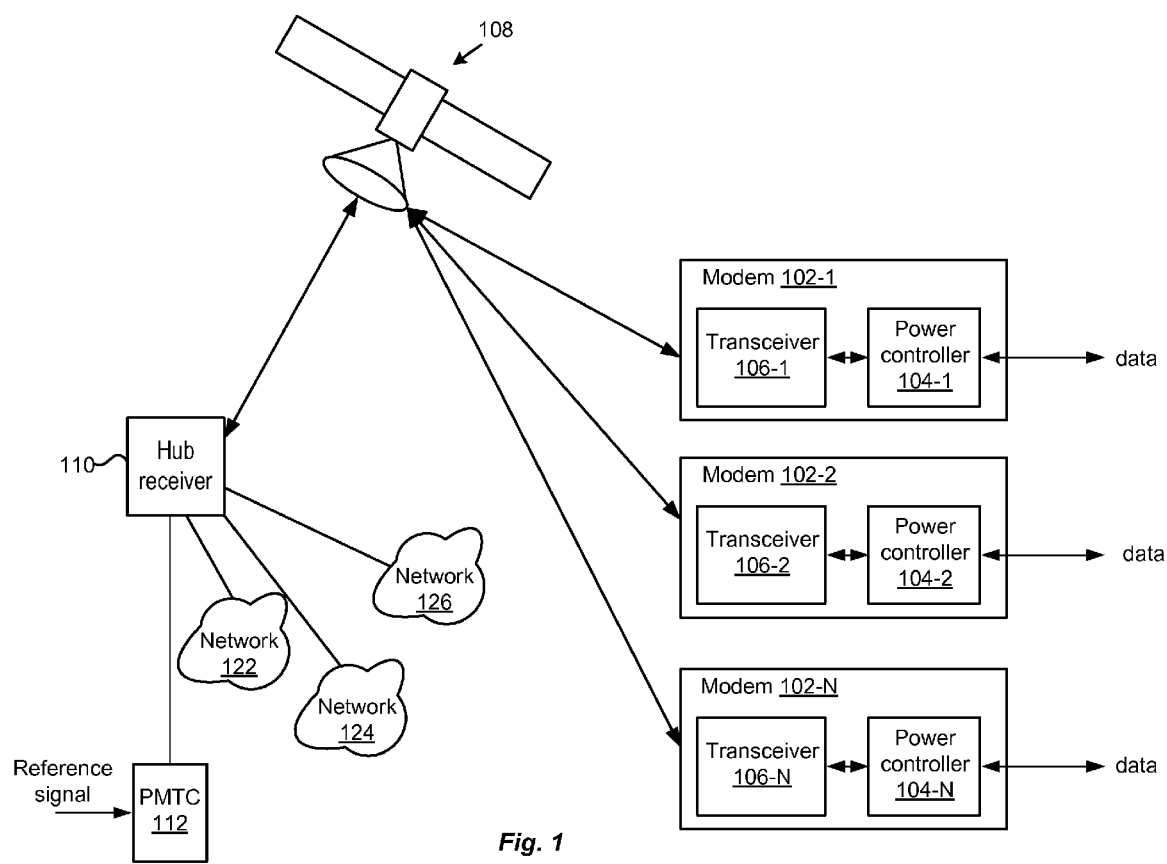
FIG. 1 depicts a simplified system for controlling power transmitted in a channel according to one embodiment of the present invention.

FIG. 1 depicts a simplified system 100 for controlling power transmitted in a channel according to one embodiment. As shown, modems 102, satellite 108, hub 110, and power management traffic controller (PMTC) 112 are provided. Modems 102 also include a transceiver 106 and a power controller 104.

Modems 102 are configured to send/receive traffic to satellite 108. For example, traffic may be received from a network, such as a local area network (LAN), and it is sent to satellite 108. Both transceivers 106-1, 106-2, . . . , 106-N may send/receive traffic to/from satellite 108. Transceivers 106 may be referred to as transmitters when transmitting data and receivers when receiving data. It will be understood that when transmitter or receiver is used, the device may also be receiving or transmitting. Traffic may be any kind of data. For example, the traffic may include video, audio, web information, ATM and point-of-sale (POS) transactions, Aloha traffic, etc.

Modems 102 may include a device that modulates an analog carrier signal to encode digital information, and also demodulates such a carrier signal to decode the transmitted information. Other devices may also be used, such as voice over Internet Protocol (IP) devices, personal computers, telephones, cellular phones, etc.

Satellite 108 may be a satellite configured to transfer data. Although satellite 108 is described, it will be recognized that other receivers may be used. For example, wireless receivers other than satellite receivers may be used in embodiments of the present invention. Further, any system that has a maximum power limit for receiving and/or transmitting traffic may be used. However, for discussion purposes, satellite 108 is described. Although a digital satellite voice communications system is described, it will be understood that other communications systems may be used. For example, systems using spread spectrum modulation, cellular systems, or other wireless systems may be used.

In FIG. 1, data modem 102-1 (e.g., a transmitter) may be used to originate a data transmission intended for data modem 102-2 (e.g., a receiver). Data traffic that can be transmitted includes Internet, voice, television, etc. For example, the transmission from modem 102-1 can be transferred through a cell phone network (not shown). Other networks and devices, such as the Internet, a local area network (LAN), switches, routers, etc., can be employed, but are not shown for ease of illustration. In general, the intermediary communication channels and devices are not included in the discussion herein. Any number and type of transmitters and/or receivers may be used, such as a pager, data modem or device that carries digitized voice, personal digital assistant (PDA), portable e-mail device (e.g., Blackberry™, etc.), laptop or other computing device, landline (e.g., plain old telephone service or POTS) telephone, etc. Further, any suitable types of transmission systems, protocols, data formats, etc., can be utilized in particular embodiments.

A transmission from modem 102-1 can be converted to an RF signal, such as a spread spectrum signal, and sent to satellite 108. Satellite 108, in turn, can send the signal to a hub (e.g., 110) for timing synchronization, signal coordination, routing and/or other processing. Thus, hub 110 may include a demodulator, data detector, error correction logic, etc.

Hub 110 shown in FIG. 1 may be coupled to other communication infrastructure and/or resources, such as Internet 122, cellular phone network 124, standard phone network 126, etc. Also, timing features in particular embodiments can be applied to any one leg or hop of a signal transmission. Further, such a transmission need not be round-trip, or need not reach its ultimate intended receiver.

Hub 110 can include processing resources, such as a central processing unit (CPU) coupled to random-access memory (RAM), and/or other typical digital computing resources. In particular embodiments, as much of the functionality as possible, as described herein, is performed by hub 120. However, in some embodiments all or a portion of the functionality may be performed by other devices, such as modems 102, satellite 110, intermediary devices (not shown), or other components or devices, as desired. Further, processing can be performed in real time or near real time. In addition, functions can be performed in a distributed processing manner (e.g., parallel processing by multiple devices), in a batch mode, or by any other suitable means.

In one example, a signal sent to hub 110 may be processed and sent back to satellite 108 for transfer to modem 102-2, which can be the ultimate intended receiver of the signal. Other communications may also be appreciated, such as all of the modems 102 may be transmitting at any time. However, the second leg of the transmission need not be by satellite. In other words, the transmission from hub 110 to satellite 108 and to modem 102-2 may be by a terrestrial network, such as the Internet, a cellular phone network, a standard telephone network, terrestrial radio network, fiber optic, etc. Although features are described herein as primarily directed to a satellite communications system, other types of communications systems can be adaptable for use in particular embodiments.

Satellite 108 may have a power limit. This power limit may be expressed in watts per hertz of bandwidth. The power limit may be sufficient to allow 2 raw bits per hertz in quadrature phase shifting key (QPSK) modulation. High order modulation schemes such as 16-quadrature amplitude modulation (QAM) and 256-QAM require more power per hertz than low order modulation schemes such as QPSK to maintain the same bit error rate. High order schemes allow for more bits per hertz than low order ones. For example, a 256-QAM delivers 8 bits per hertz compared with only 2 bits per hertz for QPSK.

Use of these high order modulation schemes were normally precluded in satellite communications because of the power limit. The power limit is specified in power per unit of bandwidth. For narrowband communications there may be insufficient power allowed within the narrow band to maintain high-order modulation. For example, receiver equipment is usually sized to only receive low order modulation. To receive high order modulation from a transmitter using the maximum allowed power in the narrow band, a prohibitively large dish would be required.

For spread spectrum communications, the power is spread over a wider bandwidth and therefore an individual transmitter's power would be well below the power limit. Only when a large number of transmitters are transmitting may the power limit be exceeded. To prevent this, spread spectrum transmitters conventionally would have been limited to transmitting a percentage of the power such that the power limit would not be exceeded if all the transmitters transmitted in a channel. For example, if there are 16 transmitters, then the transmitters may be allowed to transmit using $\frac{1}{16}$ of the power limit. This fraction of the total spread bandwidth power may not be sufficient to support high order modulation. Because of the randomness of transmission, not all transmitters may be active and therefore not all of the power in a channel may be used.

The traffic patterns in system 100 may fall within two classes: predictable or unpredictable. The predictable class may be dedicated or allocated traffic. For example, predictable traffic may include video or audio streaming, time division multiplex access (TDMA) and Demand Assignment Multiple Access (DAMA) allocated traffic. The unpredictable class may be random access or statistical traffic. For example, the unpredictable traffic may include web browsing, ATM and point-of-sale (POS) transactions, and Aloha traffic requesting DAMA access. In addition, DAMA assigned resources are often not fully utilized. For example, a transmitter that has been assigned a channel temporarily to be used for web browsing traffic typically is active less than 5% of the time the channel is assigned. The rest of the time the channel is unused.

If there is a potential for aggregate traffic to exceed the power limit, conventionally, transceivers 106 were limited in the power that they can transmit such that a certain level of power could not be exceeded. Also, there may be mechanisms inherent in the system design that accomplish the power limiting. For example, a DAMA server never allocates more bandwidth or power than the limit allows. Also, Aloha traffic is impeded by collision rates long before aggregate power becomes a problem. Predictions may be used to over-allocate a channel to allow transmitters to transmit with more power. That is, an assumption is relied upon where not all of the transceivers will transmit at the same time to exceed the power level. The transceivers are set a certain power level that they send traffic at. For example, if there are 10 modems, they may be able to send data at $\frac{1}{5}$ the aggregate power level limit. Thus, if more than five modems transmitted at the same time at the allotted power level, then the aggregate power level would be exceeded. However, the traffic predictions may be that more than five modems will not transmit at the same time.

Particular embodiments may rely on predictions to allocate power to transmitters in a channel. However, particular embodiments also control transceivers 106 to increase the power used to transmit data in a channel. For example, a number of transceivers 106 may be allowed to send data in a channel. In one case, a power limit for each transceiver 106 may be allotted. The power limit may be a level where if a number of transceivers 106 are transmitting at the same time, the power limit may not be exceeded. Also, predictions may be relied upon to over-allocate allotted power to transceivers 106. In either case, if a number of transceivers 106 were transmitting at once at an increased power level, the aggregate power level may be exceeded for the channel. However, in both cases, aggregate power may not be fully utilized in a channel. Thus, when the allotted aggregate power in the channel is not fully utilized, a transceiver 106 may increase its traffic beyond its normal portion. For example, in statistical traffic patterns where traffic sent varies, such as random access web browsing, it may be desirable to over-allocate a channel in this manner to increase the number of supported users and to give each a higher data rate. In one example, transceiver 106 may use a power-demanding high order modulation scheme to send data at a higher data rate.

The power in a channel may be monitored. For example, PMTC 112 may monitor power being used in a channel. A reference signal may be used to calculate an estimated power being used, such as the allowable power per hertz. PMTC 112 may also determine the aggregate power in the channel and compare this to the reference signal level. The reference signal may be generated by a satellite or any other device that seeks to establish a reference power level. If it is determined that more power can be used, then PMTC 112 may send signals to modems 102 that more power can be used to transmit. For example, power controller 104 may receive the signal and is configured to increase the power used to transmit data.

In one embodiment, the power used may be increased by using a high order modulation scheme as described above. Also, the data rate in which data is sent may be increased. For example, data transmitted may be sent at twice the data rate that was originally allotted to transceiver 106. Increasing the data rate increases the power used along with using a high order modulation scheme.

If high order modulation schemes are used in a fully-allocated channel and data rates are increased, it is possible for enough transceivers 106 to simultaneously access the channel and exceed the power limit. For example, a system may allow for enough power that 16 transmitters all active at once will just meet the power limit in the aggregate when they are using low order modulation. If they are each using double the power to achieve high order modulation, then the aggregate power would be double the allowed power if all were active. PMTC 112 is configured to detect an aggregate power level in the channel. For example, PMTC 112 may receive the same reference signal as described above. PMTC 112 may also determine the aggregate power in the channel and compare this to the reference signal level.

Thus, particular embodiments allow for power allotted to transceivers 106 to be increased. This allows transceivers to increase a data rate used to transmit data, which may allow for a high order modulation scheme to be used. Thus, instead of being concerned with not exceeding the power limit in a channel, particular embodiments want to over-allocate power allotted to transceivers 106 such that efficient use of the channel is provided.

When there is a potential to exceed a maximum power limit, PMTC 112 may determine that traffic should be throttled at modems 102. If traffic should be throttled, PMTC 112 facilitates the throttling of traffic. For example, signals may be sent from PMTC 112 through hub 110 and satellite 108 to modem 102. Power controller 104-1 and/or power controller 104-2 are then configured to throttle the traffic sent by transceiver 106-1 or 106-2.

Accordingly, PMTC 112 may facilitate throttling of traffic sent through the channel. PMTC 112 may measure the aggregate power of all traffic and then throttle the traffic according to the output of a closed loop controller. Thus, the total power of the channel can be kept within the prescribed power limit.

The throttling of traffic may be any modification that causes a change in power transmitted in the channel. Different methods of throttling traffic may be used. For example, throttling may be accomplished by data rate change, encoding, etc. In one embodiment, in throttling traffic to minimize power, transceiver 106 may be provided with different degrees of freedom. In one embodiment, the modulation scheme may be reduced first. This may be because it directly affects the channel power. For example, transceiver 106 may send fewer bits per hertz by using a lower-order modulation scheme. Transmitting less often may be the second option. This affects the statistics of the channel power. For example, transceiver 106 may transmit data less often but still may use a high order modulation scheme. Also, power controller 104-1 may not acknowledge traffic received from a LAN. When the traffic is not acknowledged, the LAN is configured not to send any more traffic until some of the traffic sent is acknowledged. Further, variable rate encoding may be used. Different rate codecs may be used to vary the data rate. Transceiver 106 may be using a toll-quality codec (64 kbps), and then to throttle may switch to a low rate codec (16 kbps or 6 kbps). It should be understood that any combination of the above may be used to lower the power level.

Classes of service may be defined that respond differently to the throttle command. For example, premium service customers may have their service throttled less than ordinary service customers. Also, classes of traffic may be defined that respond differently to the throttle command. For example, voice traffic may be given priority over web browsing traffic.

The throttle command can be incorporated into a larger algorithm that includes a means of local traffic estimation, classification, and prioritization. For example, a transceiver may separate outbound traffic into priority (i.e. voice) and as-available (i.e. email) classes. The transceiver may try to minimize its power impact when servicing these classes. The throttle command would be integrated into the algorithm's decision In one embodiment, to improve the aggregate statistics and allow for fine adjustment of aggregate power, transceiver 106 may randomly decide when to reduce traffic. The odds of whether to transmit with a higher or lower order modulation may be proportional to a control setting.

The power control can be combined with other techniques such as CSMA in a reservation aloha protocol to further moderate transmission decisions. One method to not transmit in a channel that may be used in Aloha schemes is carrier sense multiple access (CSMA). CSMA is a means by which a transceiver first senses whether a transmission is already within the channel and refrains from sending so as to avoid a collision. However, this method is not very effective in long latency systems such as satellite communications because the duration of a transmission is typically shorter than the round-trip latency. CSMA senses whether an individual channel is occupied and either transmits within it or not so as to avoid a collision. The decision made in CSMA is binary, that is, a go or no-go. However, embodiments may not transmit or not transmit; rather, particular embodiments minimize aggregate power in a channel. Particular embodiments introduce a range of sensitivities to the measured power. The decision may be to adjust the transmitted power or to adjust the probability of transmitting at all.

In other embodiments, PMTC 112 or PMTC functions can be performed at other points in system 100. For example, one embodiment measures aggregate power at one or more transceivers 106. Transceivers 106 then modify their traffic in response to the measured aggregate power. Other embodiments can measure aggregate power at different points such as at the satellite, at a dedicated sensing device, etc. A first transceiver 106 or other device can also be used to measure aggregate power and send an indication of the measurement to a different modem 102 or other transceivers 106. The measurement can be send via the satellite link or via a different communication link such as the Internet, a cellular phone network, etc.

Figure 2:
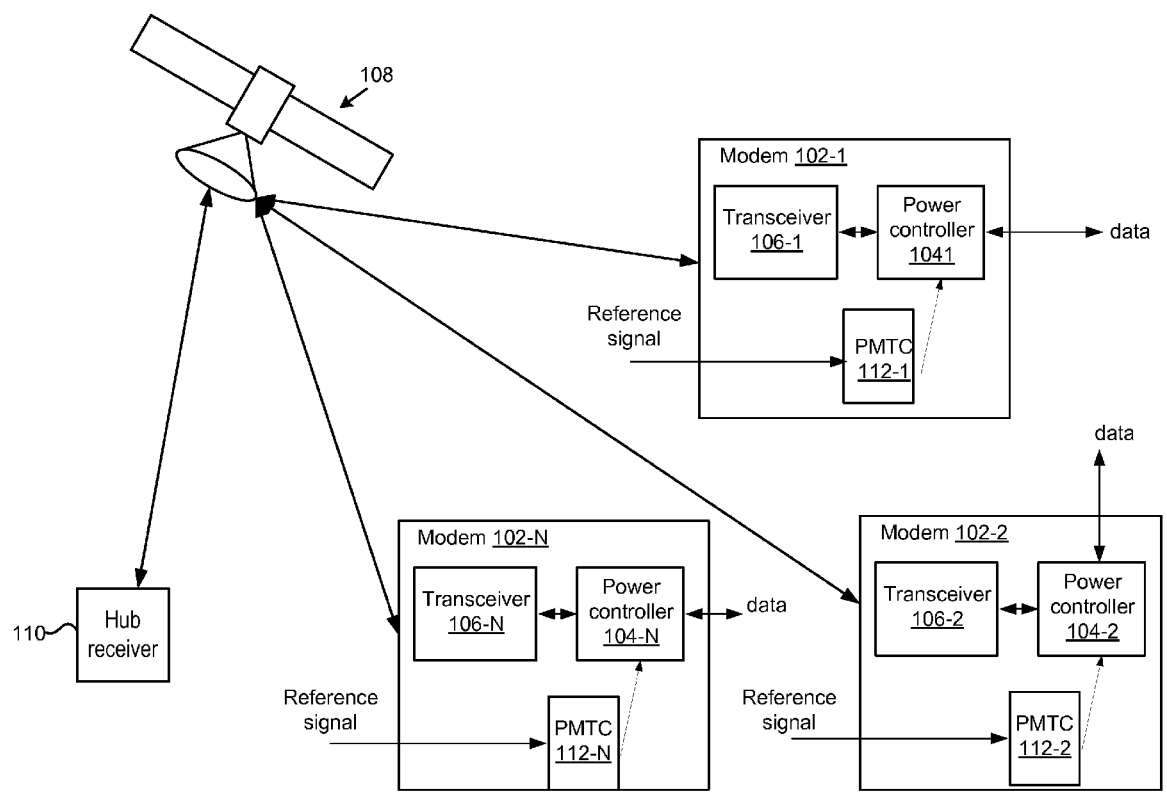
FIG. 2 depicts another embodiment of the system according to embodiments of the present invention.

An example of a transceiver that includes a PMTC 112 and can measure aggregate power and modify traffic is depicted in FIG. 2. As shown, PMTC 112 is included in each modem 102. In this case, each modem 102 may determine when aggregate power has the potential to be exceeded. When this occurs, PMTC 112 may send a signal to power controller 104. Accordingly, each modem 102 may control the power used in sending traffic. In one embodiment, PMTC 112 may receive a reference signal as described above. However, in contrast to the centralized approach described in FIG. 1, each PMTC 112 determines on its own if power should be increased or decreased at modem 102. Thus, PMTC 112-1 makes its own decision to control power in modem 102-1 and PMTC 112-2 makes its own decision to control power in modem 102-2.

Figure 3:
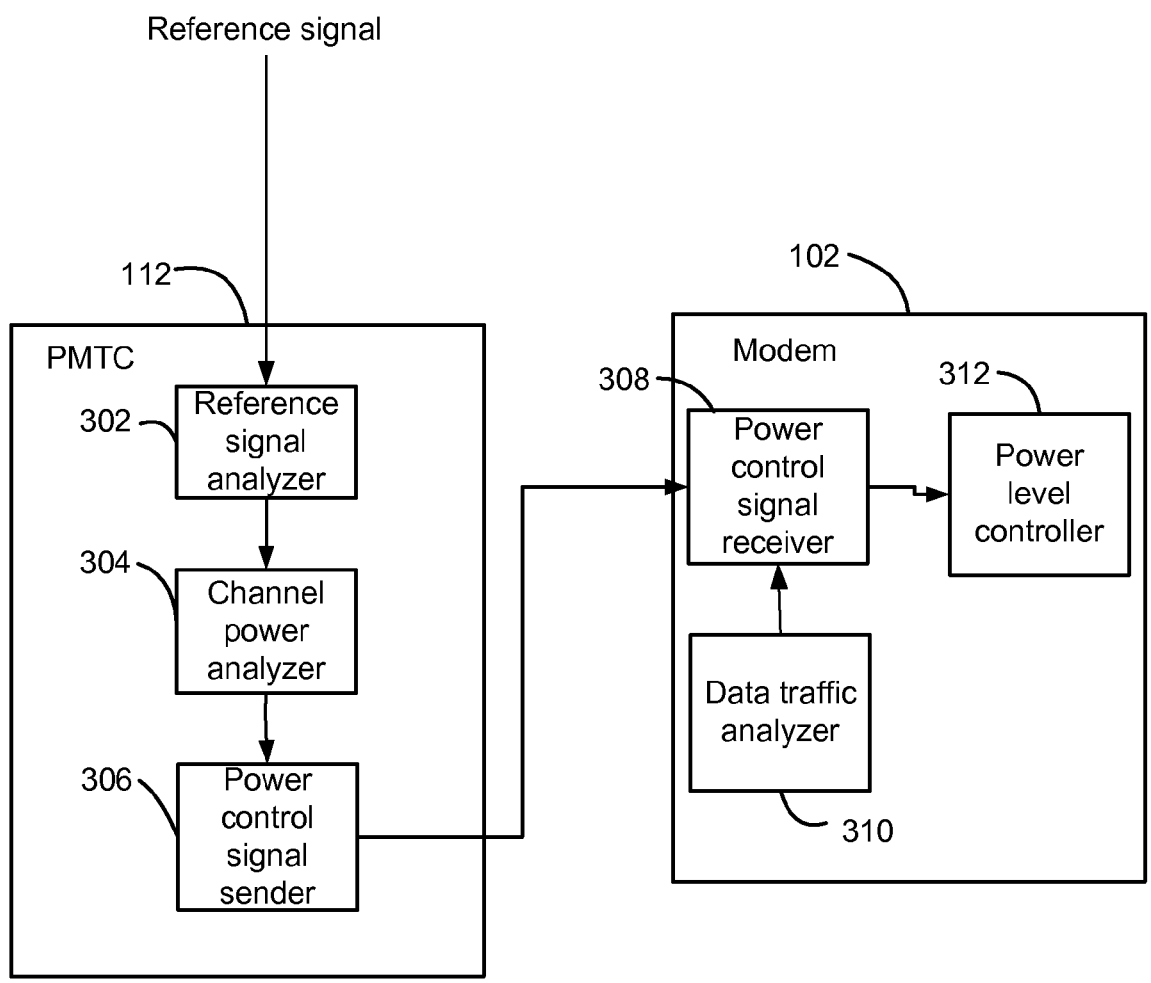
FIG. 3 depicts a more detailed embodiment of a power management traffic controller (PMTC) and power controller.

FIG. 3 depicts a more detailed embodiment of PMTC 112 and power controller 104. At PMTC 112, a reference signal analyzer 302 is configured to receive a reference signal. The reference signal may be any signal that can be used to determine power in one or more channels. The reference signal may be analyzed to determine how much power is being used.

A channel power analyzer 304 then analyzes whether or not the power used in a channel can be increased or should be decreased. For example, if the channel is being underutilized, then channel power analyzer 304 determines that power used at modems 102 can be increased. Also, if the aggregate power level is close to being reached, channel power analyzer 304 determines that power should be throttled. For example, if the power level being used in a channel reaches a certain level, such as 90% of the power limit, then it may be determined that the power being used should be throttled.

Power control signal sender 306 then sends signals to modems 102 indicating either that they can transmit with more power in the channel or that they should throttle down the power being used.

At modem 102, power controller 104 receives the signal at a power control signal receiver 308. A power level controller 312 is configured to determine if power being used can be adjusted. A data traffic analyzer 310 may analyze data traffic that needs to be sent. For example, traffic patterns may be analyzed to determine what levels are traffic are being received for sending. This information is sent to power level controller 312.

Power level controller 312 is configured to adjust the power being used in sending the data traffic. The power may be adjusted using any of the above described methods. For example, the data rate may be increased. Thus, data may be sent at twice the rate for example. Also, if a low order modulation scheme is being used, then a high order modulation scheme may be used. Other methods of increasing the power may also be appreciated.

The signal sent to increase the power from power control signal sender 306 may specify a power level that power level controller 312 can go up to. The power level may be sent to many modems 102. In one example, if all transmitters allowed to transmit in a channel transmitted at once at the higher power level, the aggregate power limit for the channel may be breached. However, PMTC 112 may determine that the power level may be increased to a certain amount based on certain conditions, such as traffic patterns, etc. Thus, a dynamic adjustment is made to increase the power that can be used in a channel. This may be different than determining traffic patterns and then pre-setting transmitters with pre-set power levels. In this case, the predictions are relied upon such that it is assumed that power in a channel will not be exceeded. However, particular embodiments allow dynamic adjustment of power consumed. Thus, current conditions can be used to adjust the power being consumed by modems 102. This may allow more efficient use of a channel because conditions may change. Thus, modems may switch from using different modulation techniques, change their data rate, etc.

Figure 4:
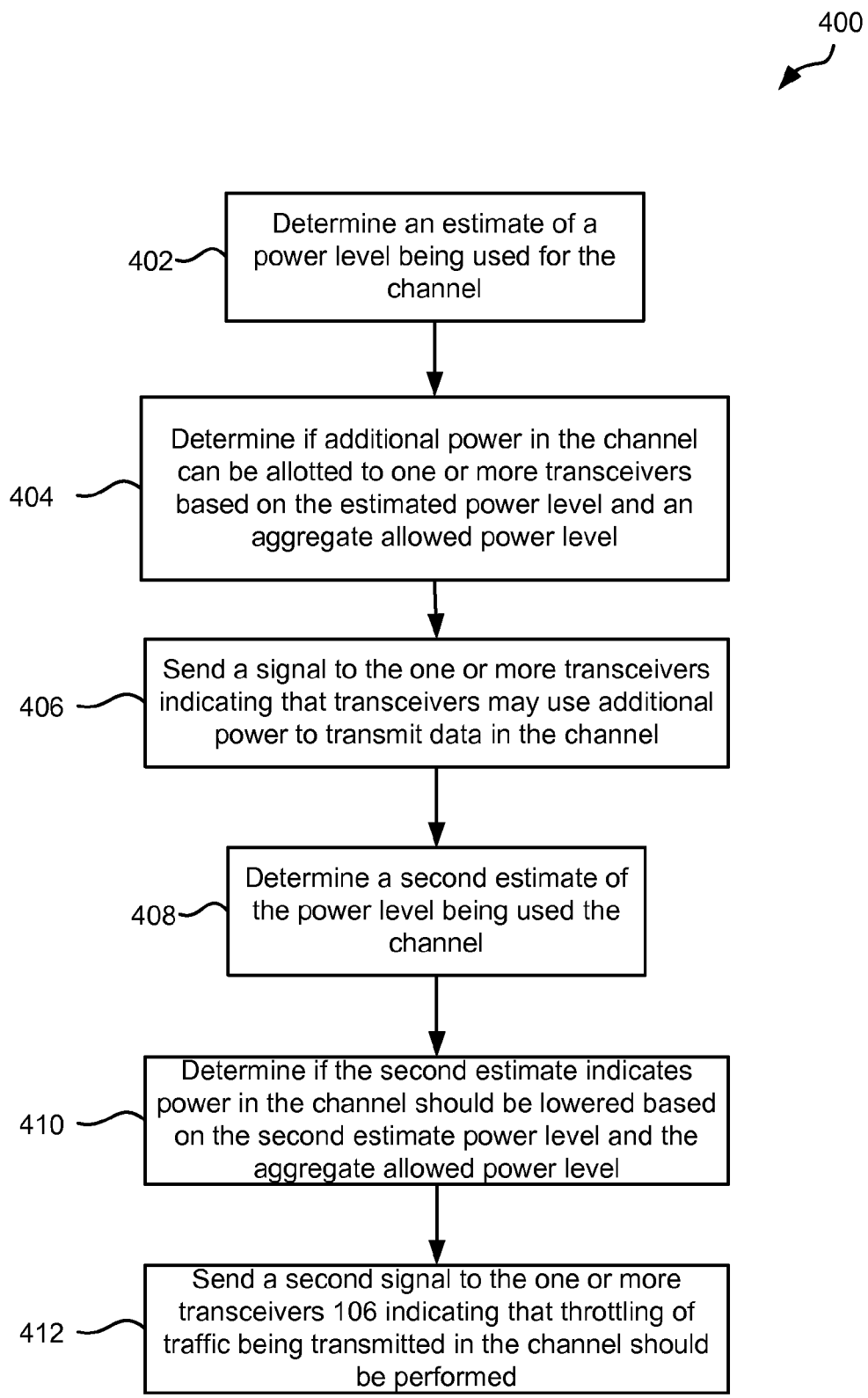
FIG. 4 depicts an example of a method for controlling power at the PMTC according to one embodiment.

FIG. 4 depicts an example of a method for controlling power at PMTC 112 according to one embodiment. Step 402 determines an estimate of a power level being used the channel. The estimate may be continually determined or at certain intervals.

Step 404 determine if additional power in the channel can be allotted to one or more transceivers 106 based on the estimate power level and an aggregate allowed power level. For example, if the power level being used is below a threshold, then more power may be allotted to transceivers 106. For example, the threshold may be 30% of the power limit.

If more power can be allotted, step 406 sends a signal to the one or more transceivers 106 indicating that transceivers 106 may use additional power to transmit data in the channel.

At some point, power being used in the channel may need to be decreased. Step 408 determines a second estimate of the power level being used the channel. Step 410 then determines if the second estimate indicates power in the channel should be lowered based on the second estimate power level and the aggregate allowed power level. For example, the power being used may be compared to a threshold and if it is above the threshold, then it is determined that less power should be used. For example, this threshold may be 80% of the power limit.

If power in the channel should be lowered, step 412 sends a second signal to the one or more transceivers 106 indicating that throttling of traffic being transmitted in the channel should be performed. The power being used in the channel may then be decreased.

Figure 5:
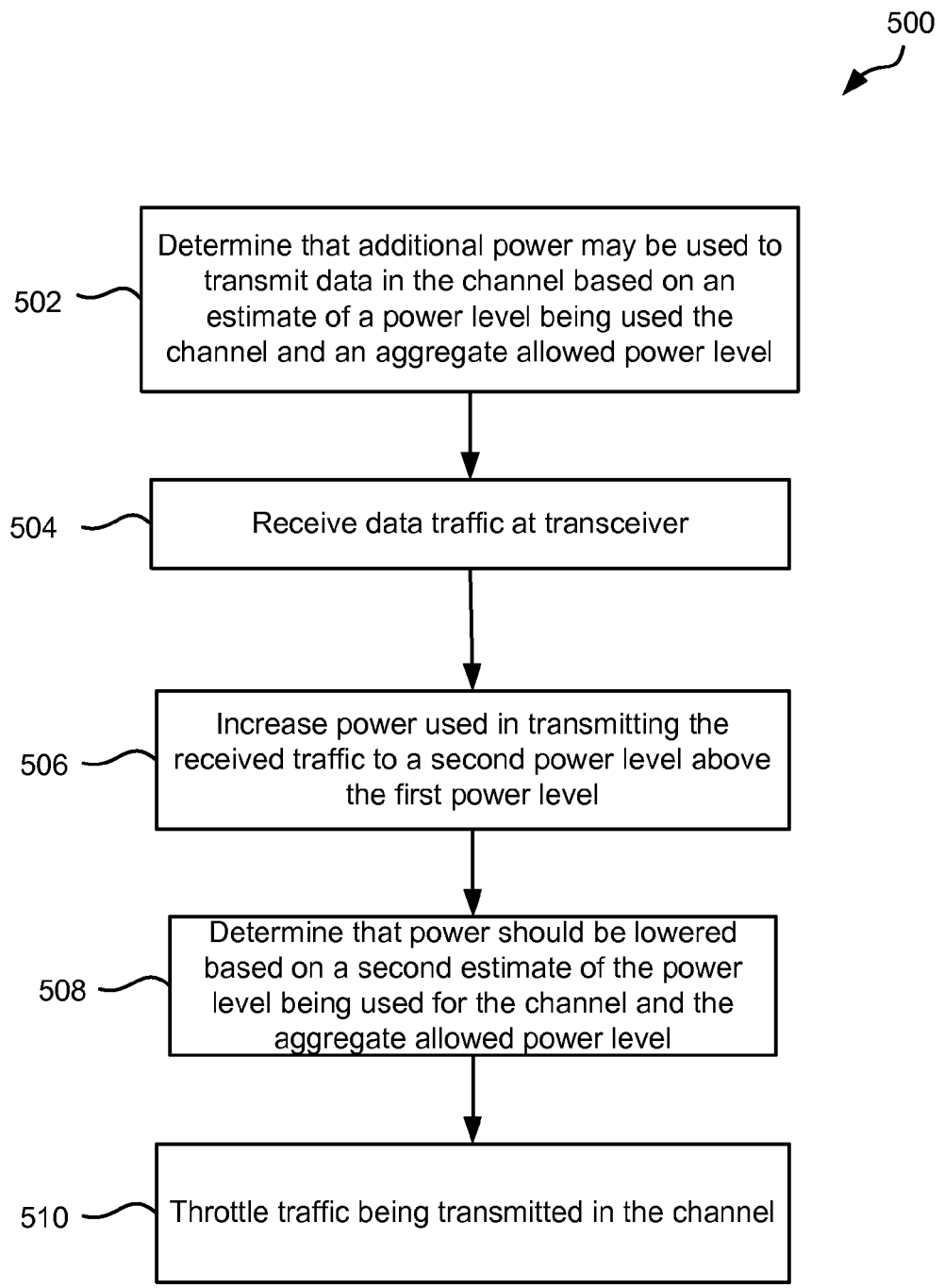
FIG. 5 depicts an example of a method for controlling power at a modem according to one embodiment.

FIG. 5 depicts an example of a method for controlling power at modem 102 according to one embodiment. Step 502 determines that additional power may be used to transmit data in the channel based on an estimate of a power level being used the channel and an aggregate allowed power level. For example, a signal may be received from PMTC 112 indicating that power being used can be increased. Transceiver 106 may be configured to transmit power at a first power level by default. The signal may indicate that additional power may be used.

Step 504 receives data traffic at transceiver 106. Step 506 increases power used in transmitting the received traffic to a second power level above the first power level. Thus, the aggregate allowed power level can be exceeded if a number of additional transmitters transmit at the second power level in the channel simultaneously with the transmitter.

Because the power limit may be exceeded, step 508 determines that power should be lowered based on a second estimate of the power level being used the channel and the aggregate allowed power level. For example, a signal may be received from PMTC 112 indicating that power being used should be lowered.

Step 510 then throttles traffic being transmitted in the channel. Thus, power being used in the channel may be lowered.

Although the invention has been described with respect to specific embodiments thereof, these embodiments are merely illustrative, and not restrictive of the invention.

Any suitable programming language can be used to implement the routines of embodiments of the present invention including C, C++, Java, assembly language, etc. Different programming techniques can be employed such as procedural or object oriented. The routines can execute on a single processing device or multiple processors. Although the steps, operations, or computations may be presented in a specific order, this order may be changed in different embodiments. In some embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer-readable medium" for purposes of embodiments of the present invention may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory.

Embodiments of the present invention can be implemented in the form of control logic in software or hardware or a combination of both. The control logic may be stored in an information storage medium, such as a computer-readable medium, as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

A "processor" or "process" includes any human, hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Embodiments of the invention may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of embodiments of the present invention can be achieved by any means as is known in the art. Distributed, or networked systems, components and circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

I claim:

1. A method for controlling power transmitted in a channel for wireless communications, wherein two or more transmitters are transmitting data in the channel at predetermined power levels, the method comprising:
   determining a first estimate of a power level used in the channel for wireless communications;
   determining a maximum power level for the channel;
   determining additional power available in the channel by comparing the estimate with the maximum power level for the channel;
   determining that the additional power in the channel can be allotted to one or more of the two or more transmitters that are transmitting data in the channel based on an aggregate allowed power level; and
   sending a signal to at least one of the one or more transmitters to cause at least one transmitter to use increased power to transmit data in the channel.

2. The method of claim 1, wherein the signal indicates a second power level that can be used by the one or more transmitters to transmit data instead of a first power level previously being used.

3. The method of claim 2, wherein if a number of one or more transmitters transmit data at the second power level, the aggregate allowed power level in the channel will be exceeded.

4. The method of claim 1, wherein the signal indicates to the one or more transmitters that transmitting with a high order modulation scheme is acceptable.

5. The method of claim 1, wherein the estimate of the power level is measured based on traffic received at or transmitted by a transmitter in the one or more transmitters.

6. The method of claim 1, further comprising:
   determining a second estimate of a power level used in the channel;
   determining that the second estimate indicates power in the channel should be lowered based on the second estimate and the aggregate allowed power level; and
   sending a second signal to at least one of the one or more transmitters indicating that throttling of traffic being transmitted in the channel should be performed.

7. The method of claim 6, wherein throttling of the traffic comprises transmitting traffic less often.

8. The method of claim 1, wherein power in the channel is distributed with a spread spectrum technique.

9. The method of claim 6, wherein throttling of the traffic comprises using a lower order modulation scheme to transmit the traffic.

10. A method for controlling power transmitted in a channel at a transmitter for wireless communications, wherein two or more transmitters are transmitting data in the channel at predetermined power levels, the method comprising:
    determining that additional power may be used to transmit data in the channel based on an estimate of a power level being used in the channel and an aggregate allowed power level, wherein a transmitter is configured to transmit power at a first power level;
    receiving data traffic at the transmitter for the wireless communications; and
    increasing power used in transmitting the received traffic to a second power level above the first power level, wherein the aggregate allowed power level can be exceeded if a number of additional transmitters transmit at the second power level in the channel simultaneously with the transmitter.

11. The method of claim 10, wherein increasing power comprises transmitting the received data traffic with a high order modulation scheme.

12. The method of claim 11, wherein increasing power comprises changing from a low order modulation scheme to a high order modulation scheme to transmit the received data.

13. The method of claim 11, wherein increasing power comprises increasing the data rate used to transmit the received data.

14. The method of claim 10, wherein determining that additional power may be used comprises receiving a signal indicating additional power can be used.

15. The method of claim 10, further comprising:
    determining that power should be lowered based on a second estimate of a power level used in the channel and the aggregate allowed power level; and
    throttling traffic being transmitted in the channel.

16. The method of claim 15, wherein throttling of the traffic comprises transmitting traffic less often.

17. The method of claim 15, wherein throttling of the traffic comprises using a lower order modulation scheme to transmit the traffic.

18. The method of claim 10, wherein power in the channel is distributed with a spread spectrum technique.

19. An apparatus configured to control power transmitted in a channel for wireless communications, wherein two or more transmitters are transmitting data in the channel at predetermined power levels, the apparatus comprising:
    logic, when executed by a processor, that is operable to:
    determine an estimate of a power level being used in the channel for wireless communications;
    determine if additional power in the channel can be allotted to one or more transmitters based on the estimate power level and an aggregate allowed power level; and
    send a signal to the one or more transmitters indicating that the transmitter may use additional power to transmit data in the channel if more power can be allotted.

20. An apparatus configured to control power transmitted in a channel at a transmitter for wireless communications, wherein two or more transmitters are transmitting data in the channel at predetermined power levels, the apparatus comprising:
    logic, when executed by a processor, that is operable to:
    determine that additional power may be used to transmit data in the channel based on an estimate of a power level being used in the channel and an aggregate allowed power level, wherein a transmitter is configured to transmit power at a first power level;
    receive data traffic at the transmitter for the wireless communications; and
    increase power used in transmitting the received traffic to a second power level above the first power level, wherein the aggregate allowed power level can be exceeded if a number of additional transmitters transmit at the second power level in the channel simultaneously with the transmitter.

* * * * *